(12) United States Patent
Song et al.

(10) Patent No.: US 10,810,516 B2
(45) Date of Patent: Oct. 20, 2020

(54) METHOD AND COMPUTER PROGRAM FOR PROVIDING INFORMATION WITH FLIGHT TICKET SEARCH

(71) Applicant: NAVER CORPORATION, Seongnam-si (KR)

(72) Inventors: Ki Ho Song, Seongnam-si (KR); Hae Rin Kim, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 631 days.

(21) Appl. No.: 14/966,727

(22) Filed: Dec. 11, 2015

(65) Prior Publication Data
US 2016/0350678 A1 Dec. 1, 2016

(30) Foreign Application Priority Data

May 27, 2015 (KR) ........................ 10-2015-0073889

(51) Int. Cl.
*G06Q 10/02* (2012.01)
*G06Q 50/14* (2012.01)
*G06Q 30/02* (2012.01)

(52) U.S. Cl.
CPC ......... *G06Q 10/02* (2013.01); *G06Q 30/0256* (2013.01); *G06Q 50/14* (2013.01)

(58) Field of Classification Search
CPC .................................................... G06Q 10/02
See application file for complete search history.

(56) References Cited

U.S. PATENT DOCUMENTS 6,360,205 B1 * 3/2002 Iyengar .................. G06Q 10/02
 705/5
8,819,053 B1 * 8/2014 Funaro ................... G06Q 50/14
 707/767

(Continued)

FOREIGN PATENT DOCUMENTS

JP 2013-222412 10/2013
KR 10-2002-0023556 3/2002

(Continued)

OTHER PUBLICATIONS

Webb, Kristina, "Google's flight-search tool getting thumbs-up," Palm Beach Post, GateHouse Media Inc., West Palm Beach, Florida, Mar. 7, 2015, B.6.*

(Continued)

*Primary Examiner* — Nathan Erb
(74) *Attorney, Agent, or Firm* — Greer Burns & Crain, Ltd.

(57) ABSTRACT

A method for providing information related to a flight ticket search, and a user terminal, a server, and a computer program, which are related to the search method. The method for providing information by a server while searching for a flight ticket includes receiving flight schedule information of a user transmitted from a user terminal; collecting information on places to visit using the flight schedule information; transmitting the collected information on the places to visit to the user terminal and making the user terminal provide the user with a travel information providing screen including the information on the places to visit together with at least a part of the flight schedule information before the server searches for the flight ticket information that corresponds to the flight schedule information and transmits the searched flight ticket information to the user (Continued)

terminal; and transmitting the searched flight ticket information to the user terminal.

13 Claims, 11 Drawing Sheets

(56) References Cited

U.S. PATENT DOCUMENTS

| | | | |
|---|---|---|---|
| 9,483,495 B1* | 11/2016 | James | G06Q 30/0627 |
| 9,734,722 B1* | 8/2017 | Markey | G08G 5/0021 |
| 2002/0133385 A1* | 9/2002 | Fox | G06Q 10/06 |
| | | | 705/7.28 |
| 2003/0084449 A1* | 5/2003 | Chane | H04N 5/44543 |
| | | | 725/46 |
| 2004/0243299 A1* | 12/2004 | Scaer | G06Q 10/08 |
| | | | 701/522 |
| 2010/0228574 A1* | 9/2010 | Mundinger | G06Q 10/047 |
| | | | 705/4 |
| 2013/0014169 A1* | 1/2013 | Sansom | G06F 17/3082 |
| | | | 725/48 |
| 2013/0103680 A1* | 4/2013 | Arrasvuori | G06F 17/301 |
| | | | 707/728 |
| 2013/0275418 A1* | 10/2013 | Kumar, V | G06F 17/3053 |
| | | | 707/723 |
| 2015/0012467 A1* | 1/2015 | Greystoke | G06N 99/005 |
| | | | 706/12 |
| 2018/0112995 A1* | 4/2018 | Bortolussi | H04W 4/025 |

FOREIGN PATENT DOCUMENTS

| | | |
|---|---|---|
| KR | 10-2013-0047165 | 5/2013 |
| KR | 10-2014-0046792 | 4/2014 |

OTHER PUBLICATIONS

Korean office action issued in corresponding Korean Patent App. No. 10-2015-0073889, dated Mar. 21, 2016.

* cited by examiner

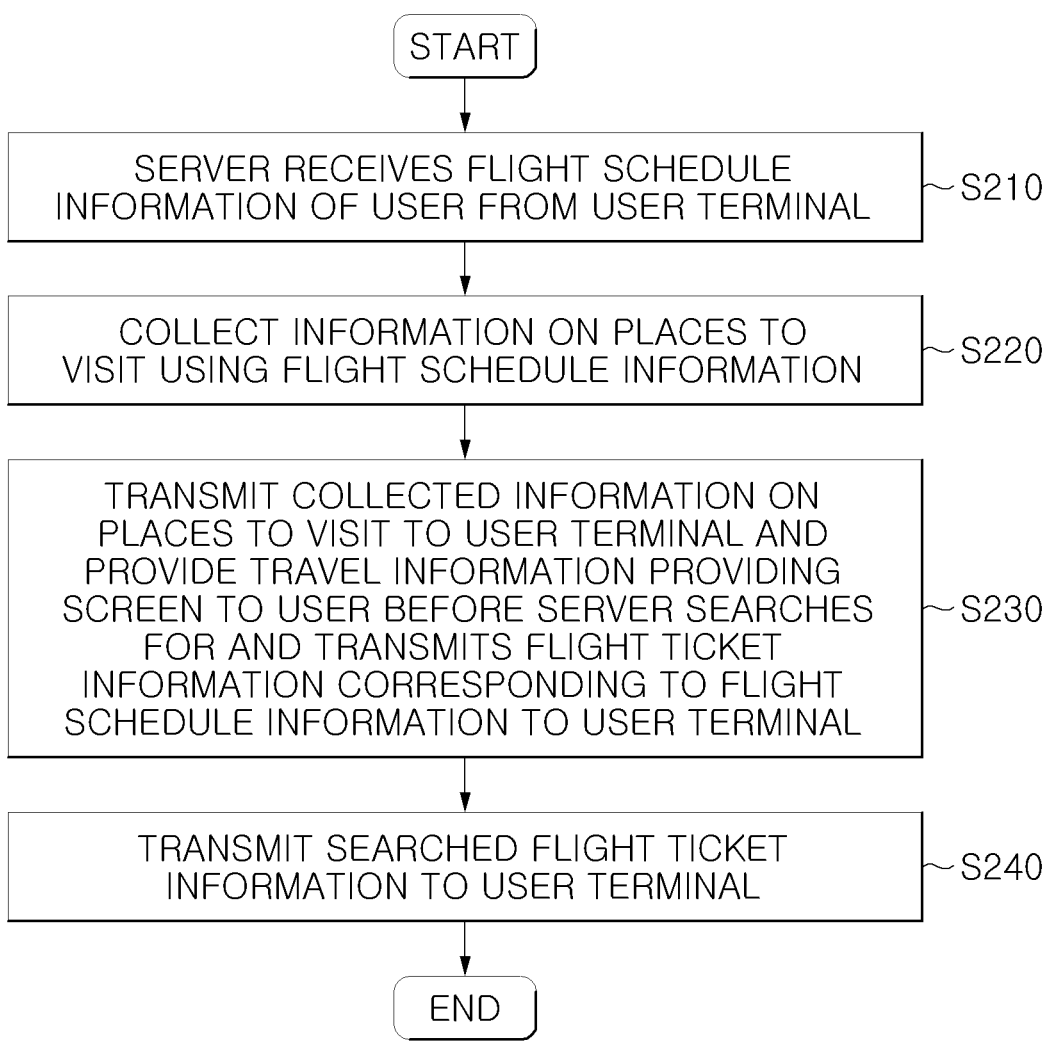

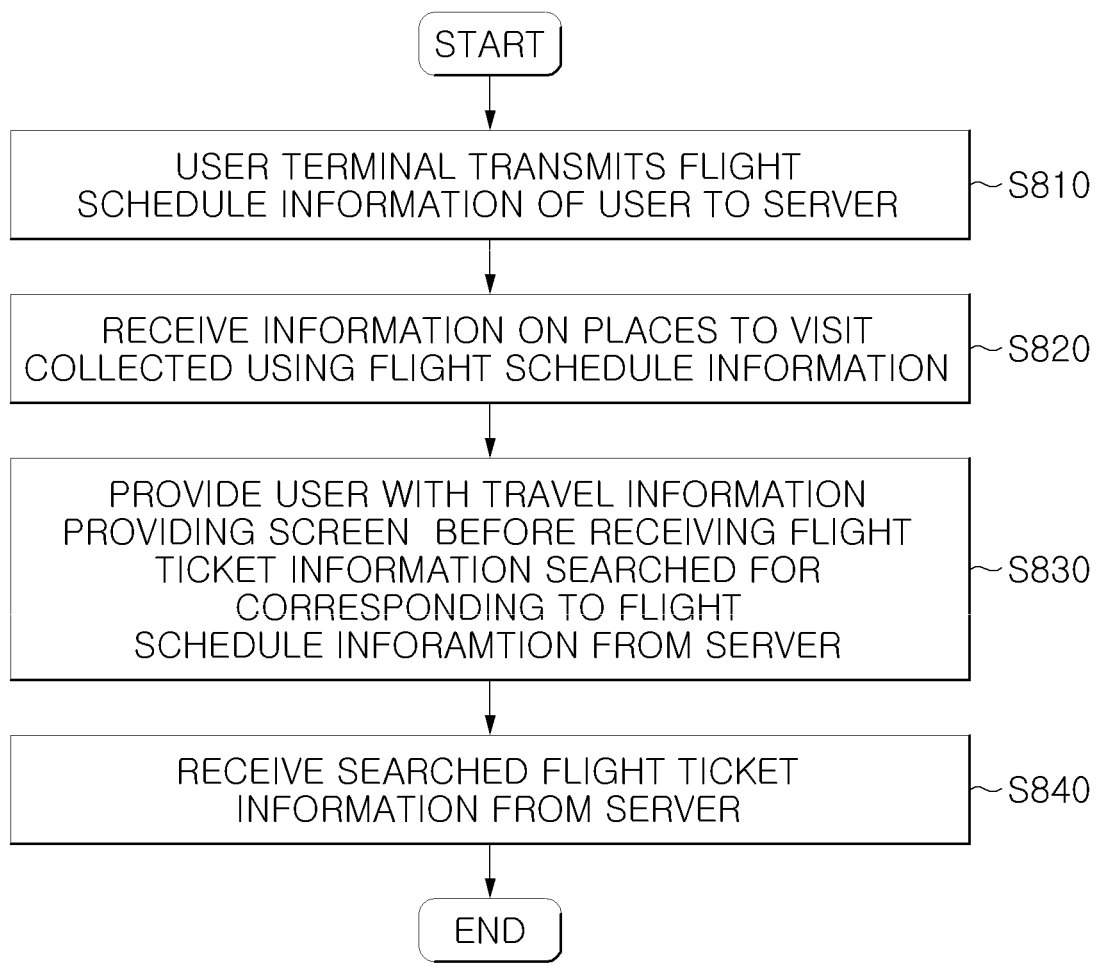

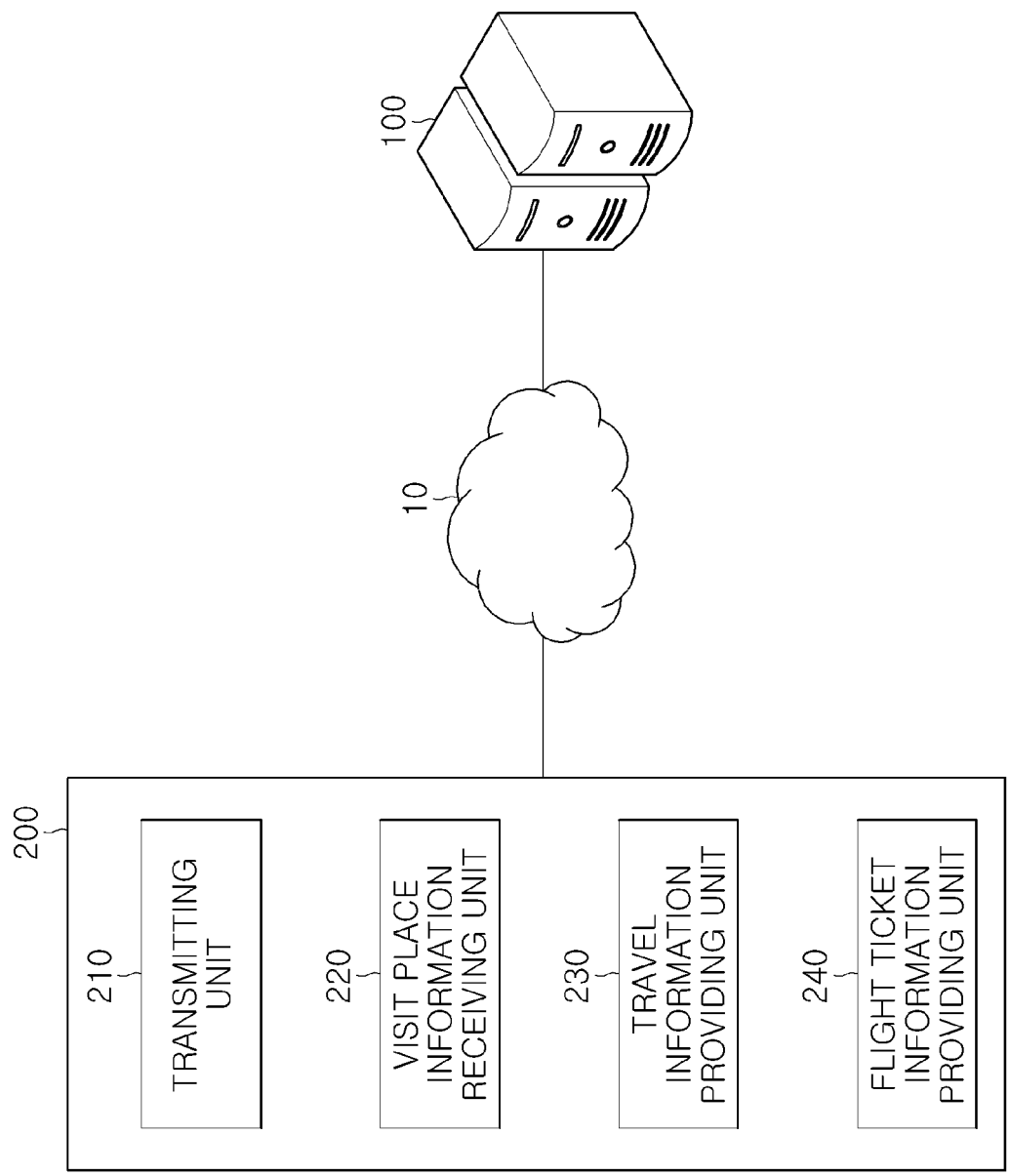

METHOD AND COMPUTER PROGRAM FOR PROVIDING INFORMATION WITH FLIGHT TICKET SEARCH

BACKGROUND OF THE INVENTION

Field of the Invention

The present invention relates generally to a method for providing information with a flight ticket search, a server used for the flight ticket search method, and a computer program related to the flight ticket search method, and more particularly, to a method and a computer program for effectively providing a user with travel-related information, such as flight schedule information and information on places to visit, while the user waits for the results of the flight ticket search.

Description of the Related Art

Recently, with frequent domestic and overseas vacations and business trips, the demand for flights has been rapidly increasing, and such increases of flight demands is expected to continue for a considerable period of time in the future. In relation to this, many users collect travel-related information, such as information on places to visit, using typical Internet searches or the like, for their vacations and business trips.

Further, a large number of users obtain not only information on places to visit, such as overseas places to travel, but also flight ticket information through the Internet or the like. In this case, since the users can search and select a variety of airlines and flight paths, they may find flight tickets suitable for themselves in consideration of their schedules and flight ticket prices.

In relation to this, in order to seek user convenience in searching for flight tickets, services have been created to collect flight ticket information of a plurality of travel agency sites and to provide the users with the collected flight ticket information. However, in order to search for, process, and provide the users with a large amount of data, such as various airlines and flight paths, and various flight ticket prices according to the respective travel agencies, a considerable amount of time may be required, and thus the users need to meaninglessly wait for the considerable time that is required for the flight ticket search, which causes inconvenience to the users. Further, due to this, it frequently occurs that the users interrupt the use of the corresponding flight ticket search services and/or move on to other flight ticket search services.

Further, in order to search for a large amount of data, such as various airlines and flight paths, and various flight ticket prices according to respective travel agencies, it may be required to input complicated search conditions and/or the search results may be provided in a complicated manner.

In addition, since the users may show a keen interest in the information on places to visit together with the flight ticket information, it may be required for the users to search for the travel-related information, such as the information on places to visit, separately from the flight ticket search, and this may cause inconvenience to the users.

Accordingly, there has been a need for schemes to more effectively provide the users with the travel-related information, such as the information on places to visit, together with the flight ticket information.

RELATED ART DOCUMENT

Patent Document

Korean Patent Application Publication No. 10-2002-0023556

SUMMARY OF THE INVENTION

Accordingly, the present invention has been made keeping in mind the above problems occurring in the related art, and one aspect of the present invention is to provide a method and a computer program for providing information with a flight ticket search, which can avoid a user from meaninglessly waiting for a considerable time in searching for flight ticket information and thus minimize the risk that the user withdraws from corresponding flight ticket search service.

Another aspect of the present invention is to provide a method and a computer program for providing information with a flight ticket search, which can provide a user with travel-related information, such as information on places to visit, together with flight ticket information.

Still another aspect of the present invention is to provide a method and a computer program for providing information with a flight ticket search, which can eliminate the need to input complicated search conditions, and that can provide an output of the search results in a simplified manner.

According to one aspect of the present invention, there is provided a method for providing information by a server while searching for a flight ticket, which includes the steps of receiving flight schedule information of a user that is transmitted from a user terminal; collecting information on places to visit using the flight schedule information; transmitting the collected information on the places to visit to the user terminal and making the user terminal provide the user with a travel information providing screen including the information on the places to visit together with a part of the flight schedule information (or with the flight schedule information in its entirety) before the server searches for flight ticket information that corresponds to the flight schedule information and transmits the searched flight ticket information to the user terminal; and transmitting the searched flight ticket information to the user terminal.

According to another aspect of the present invention, there is provided a method for providing information by a user terminal while searching for a flight ticket, which includes the steps of transmitting flight schedule information of a user to a server; receiving information on places to visit collected using the flight schedule information transmitted from the server; providing the user with a travel information providing screen including the information on the places to visit together with a part of the flight schedule information or with the flight schedule information in its entirety) before receiving flight ticket information that is searched for corresponding to the flight schedule information from the server; and receiving the searched flight ticket information from the server.

According to still another aspect of the present invention, there is provided a computer program stored in a computer readable medium to execute the steps of, at a terminal, transmitting flight schedule information of a user to a server; receiving information on places to visit collected using the flight schedule information transmitted from the server; providing the user with a travel information providing screen including the information on the places to visit together with a part of the flight schedule information or with the flight schedule information in its entirety) before receiving flight ticket information that is searched for corresponding to the flight schedule information from the server; and receiving the searched flight ticket information from the server.

According to the method and the computer program for providing information with a flight ticket search according to the aspect of the present invention, in the case where the user searches for the flight ticket information, the travel information, such as the information on the places to visit, can be rapidly provided to the user while the server proceeds with the flight ticket search. Accordingly, the user can be prevented from meaninglessly waiting for a considerable amount of time, thus eliminating such inconvenience, and further, the user can be prevented from withdrawing from the corresponding flight ticket search service due to the inconvenience.

Further, according to the method and the computer program for providing information with a flight ticket search according to the aspect of the present invention, in the case where the user searches for the flight ticket information, the travel information, such as the information on the places to visit, can be provided, without any separate search process, in addition to the search result of the flight ticket information.

Further, according to the method and the computer program for providing information with a flight ticket search according to the aspect of the present invention, the input of complicated search conditions is eliminated, and the output of the search results can be simply performed.

BRIEF DESCRIPTION OF THE DRAWINGS

The accompanying drawings included as a part of the detailed description provide an easily understood description of the present invention and show embodiments of the present invention and explain technical ideas of the present invention. The above and other objects, features and other advantages of the present invention will be more clearly understood from the following detailed description when taken in conjunction with the accompanying drawings, in which:

FIG. 2 is a flowchart showing a method for providing information with a flight ticket search according to an embodiment of the present invention;

FIG. 8 is a flowchart showing a method for providing information with a flight ticket search according to another embodiment of the present invention; and FIG. 9 is a view showing the configuration of a user terminal that provides information with a flight ticket search according to an embodiment of the present invention.

DETAILED DESCRIPTION OF THE INVENTION

Figure 1:
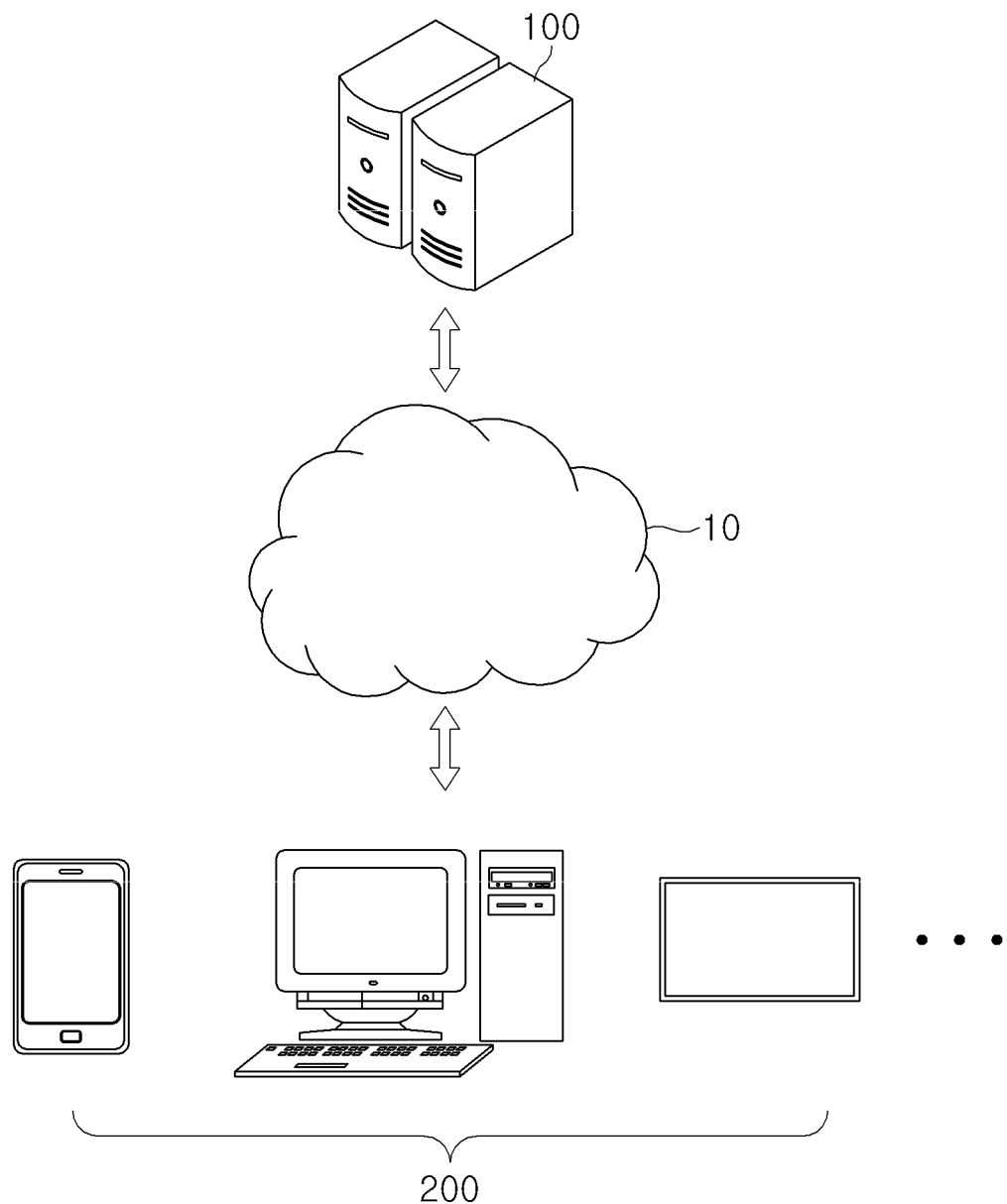
FIG. 1 is a view showing the configuration of a system for providing information with a flight ticket search according to an embodiment of the present invention.

Embodiments of the present invention are capable of various modifications and alternative forms and are shown by way of example in the drawings, and the embodiments of the present invention will herein be described in detail. In the following description, it is to be noted that, when the functions of conventional elements and the detailed description of elements related to the present invention may make the gist of the present invention unclear, a detailed description of those elements will be omitted.

The present invention will be described in detail below with reference to the accompanying drawings. The detailed description which will be described below with reference to the accompanying drawings is only intended to explain exemplary embodiments of the present invention, and the present invention should not be construed as limited to the embodiments set forth herein.

Hereinafter, a method and a computer program for providing information with a flight ticket search according to exemplary embodiments of the present invention will be described in detail with reference to the accompanying drawings.

FIG. 1 is a view showing the configuration of a system for providing information with a flight ticket search according to an embodiment of the present invention. As shown in FIG. 1, a system for providing information with a flight ticket search according to an embodiment of the present invention may include a server 100, a user terminal 200, and a network 10 configured to relay data communication between them.

The network 10 may include a wired network and a wireless network, and specifically, may include various networks, such as a LAN (Local Area Network), a MAN (Metropolitan Area Network), and a WAN (Wide Area Network). Further, the network 10 may also include the well-known world wide web (WWW). However, the network 10 according to the present invention is not limited to the above-described networks, but may include any known wireless data network, any known telephone network, or any known wired/wireless television network at least partly.

The server 100 receives flight schedule information that a user inputs using the user terminal 200, searches for flight ticket information using the received flight schedule information, and transmits the searched flight ticket information to the user terminal 200 to provide the user with the flight ticket information.

However, in searching for the flight ticket information with regard to the flight schedule information, it may take a considerable amount of time for the server 100 to search for, and process, a large amount of data, such as various airlines and flight paths, and various flight ticket prices according to a plurality of respective travel agencies, and thus the user must meaninglessly wait for a considerable amount of time, which causes the user inconvenience. Further, due to such inconvenience, a problem may occur in which the user interrupts the use of the corresponding flight ticket search service and moves to another flight ticket search service.

Further, since the user may typically show a keen interest in the information on the places to visit together with the flight ticket information, it may be required for the user to search for travel information, such as the information on the places to visit, through a separate process, and this may cause the user inconvenience.

The server 100 according to an embodiment of the present invention collects the information on the places to visit using the flight schedule information, and transmits the collected information on the places to visit to the user terminal 200, so that the user terminal 200 provides the user with the travel information, such as the flight schedule information and the information on the places to visit, during a time when the flight ticket information is searched for. Accordingly, the server can prevent the user from meaninglessly wasting time while waiting for the search result, and further can enable the user to obtain the travel information more conveniently.

In this case, the information on the places to visit may include various kinds of information, such as photos, pictures, and moving images (such as videos) related to the places to visit, exchange rates, weather, sightseeing resorts, accommodations, and traffic information.

Further, the user terminal 200 transmits the flight schedule information that is input by the user to the server 100, receives the information on the places to visit from the server 100, and provides the user with the received information on the places to visit while the server 100 searches for the flight ticket information that corresponds to the flight schedule information. Accordingly, the user terminal 200 can prevent the user from meaninglessly wasting time while waiting for the search result, and further can enable the user to obtain the travel information more conveniently.

As the user terminal 200, various kinds of terminal devices which can communicate with the server 100 through the network 10, such as a personal computer (PC) and a notebook PC, may be used together with various kinds of portable terminals, such as a smart phone, a tablet PC, a PDA, and a portable phone.

Hereinafter, with reference to FIG. 2, the operation of the server 100 according to an embodiment of the present invention will be described in more detail.

FIG. 2 is a flowchart showing a method for providing information with a flight ticket search according to an embodiment of the present invention.

First, at step S210, the server 100 receives the flight schedule information that is input by the user from the user terminal 200. In this case, the flight schedule information may include at least one of departure place, arrival place, departure date, and arrival date. The user may input the flight schedule information using a specific interface, such as a web page, that is provided through the user terminal 200.

Figure 4:
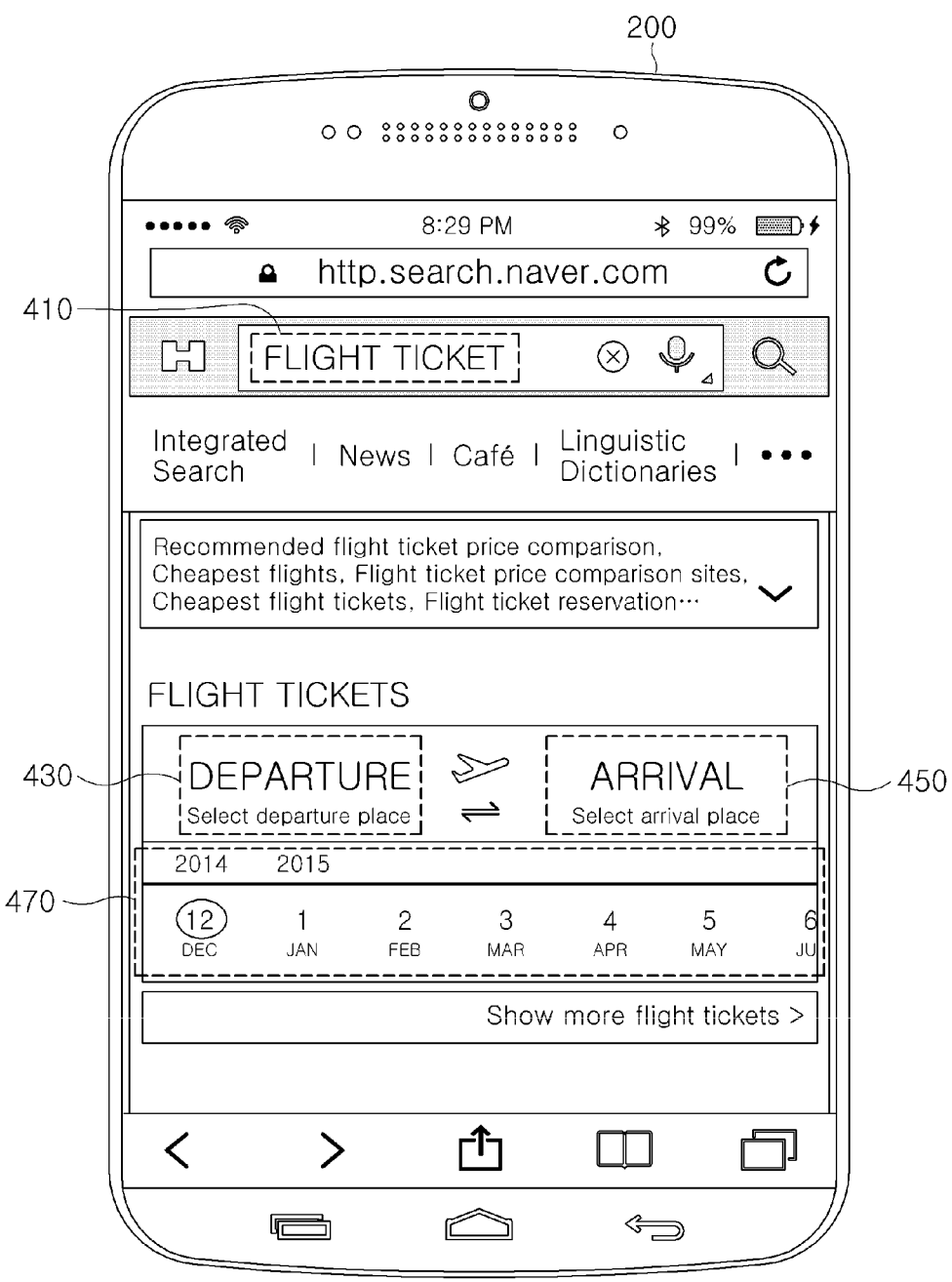
FIG. 4 is an exemplary view showing a flight schedule information input screen according to an embodiment of the present invention.

For example, FIG. 4 exemplifies a flight schedule information input screen according to an embodiment of the present invention. As shown in FIG. 4, a web page that is provided to the user through the user terminal 200 may include a first input menu 430 for inputting a departure place, a second input menu 450 for inputting a place to visit, and a third input menu 470 for inputting a travel schedule (including the desired dates of travel). The web page illustrated in FIG. 4 may be transmitted to the user terminal 200 to be provided to the user in order to receive an input of the user's flight schedule information. The web page of FIG. 4 is merely exemplary, and the shapes and kinds of the respective menus 430, 450, and 470 that are included in the web page may be variously modified as needed.

According to implementation examples, after receiving the flight schedule information through the web page, the server 100 may transmit another web page to the user terminal 200 in order to receive more accurate flight schedule information.

Next, at step S220, the server 100 collects the information on the places to visit using the flight schedule information that is transmitted from the user terminal 200.

In this case, since the flight schedule information includes one or more places to visit, at which an airplane arrives, the server 100 can collect the information on the places to visit around the one or more places to visit. For example, in the case of using a flight which departs from Incheon in Korea and arrives in Los Angeles (LA) in USA, the server 100 may collect information on LA, and in the case of going from Incheon to New York via LA, the server 100 may collect information on at least one of LA and New York.

Further, in an embodiment of the present invention, in collecting the information on the places to visit, the server 100 may search for and collect information that has been pre-stored in a database. For example, after constructing a database in which photos of main places to visit are pre-stored, the server 100 may search for and collect photos of places to visit corresponding to the flight schedule information that is input by the user. In addition to the photos, it is also possible to perform implementation in the same manner even with respect to various other kinds of information, such as pictures and moving images related to the places to visit, exchange rates, weather, sightseeing resorts, accommodations, and traffic information. Further, in the case of information that may be changed at any time, such as exchange rates or weather, it is also possible to collect and use information that is provided in real time from another server, as needed.

Further, in collecting the information, such as the photos, pictures, or moving images related to the places to visit, and sightseeing resorts, it is also possible to calculate the schedule in which the user visits the places to visit from the flight schedule information and then to collect the information on the places to visit in consideration of the calculated schedule. For example, in the case where the user visits the places to visit in spring, it may be possible to collect photos of sightseeing resorts that may be visited in spring from the places to visit, while in the case of visiting the places to visit in winter, it may be possible to collect and provide photos that coincide with winter images of the places to visit.

Next, at step S230, the server 100 transmits the information on the places to visit, which is collected by the server 100 at step S220, to the user terminal 200 and makes the user terminal 200 provide the user with a travel information providing screen while the server 100 searches for flight ticket information that corresponds to the flight schedule information that is input by the user, that is, before the server 100 transmits the result of the flight ticket information search to the user terminal 200.

Accordingly, the user can be prevented from meaninglessly waiting for a considerable amount of time, which is required for the server 100 to search for, process, and provide the user with a large amount of data, such as various airlines and flight paths, and various flight ticket prices according to respective travel agencies, thereby removing this inconvenience to the user.

Figure 3A:
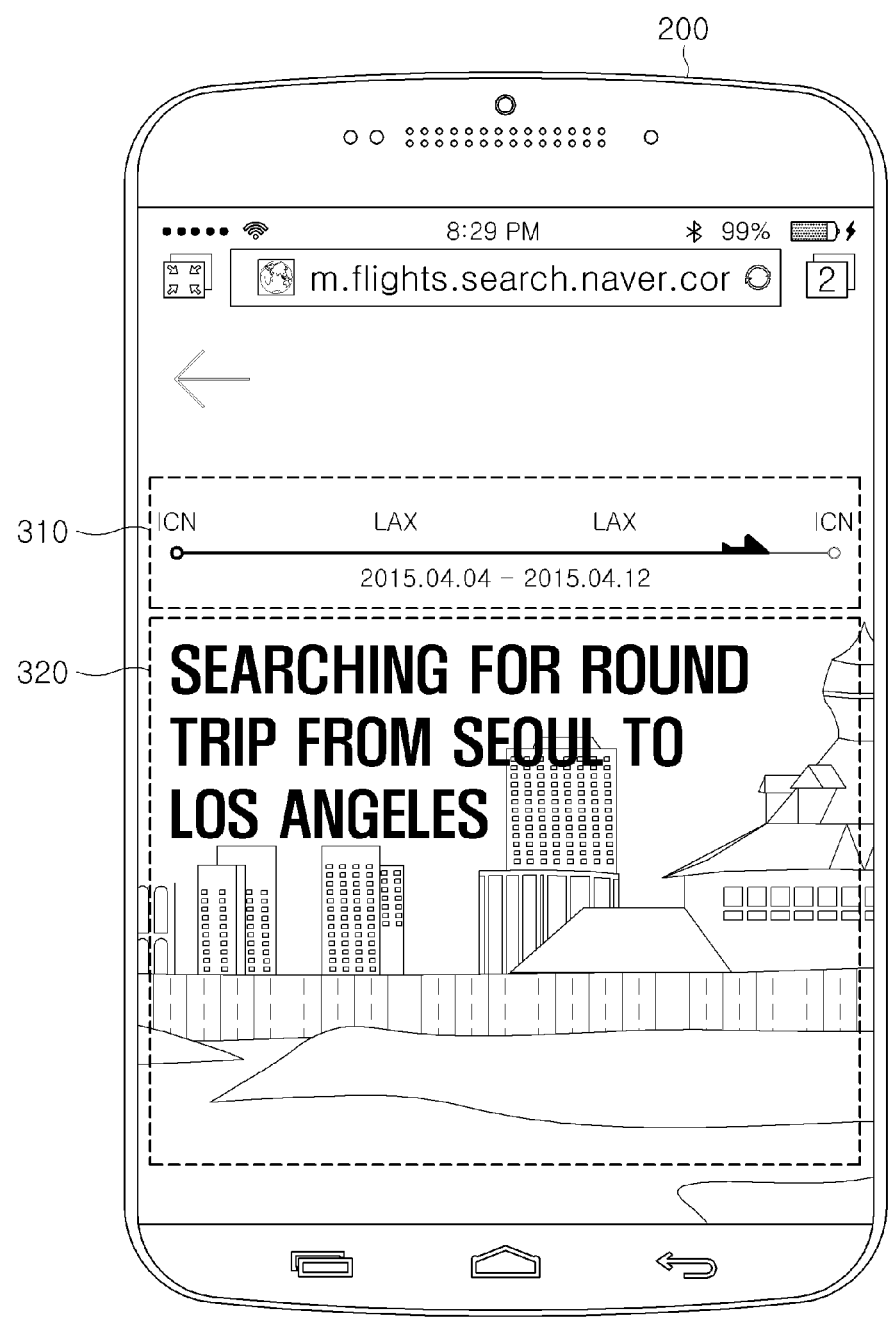
FIG. 3A is an exemplary view showing a travel information providing screen with a flight ticket search according to an embodiment of the present invention.

The travel information providing screen may include the information on places to visit together with a part of (or the entirety of) the flight schedule information. For example, as shown in FIG. 3A, a flight path and a schedule of round-trip flights from Seoul (Incheon) to LA are displayed in area 310, and a photo of LA that is a place to visit is included at area 320 to be provided as a background image. In this case, as shown in FIG. 3A, since the photo or the picture of the place to visit is used as the background image of the travel information providing screen, the visual effect of the photo or the picture of the place to visit is maximized, and thus the user's attention thereon can be heightened.

Further, as the information on the place to visit, the travel information providing screen may include various kinds of information, such as moving images of the place to visit, exchange rates, weather, sightseeing resorts, and traffic information, in addition to the photo and the picture of the place to visit.

Figure 3B:
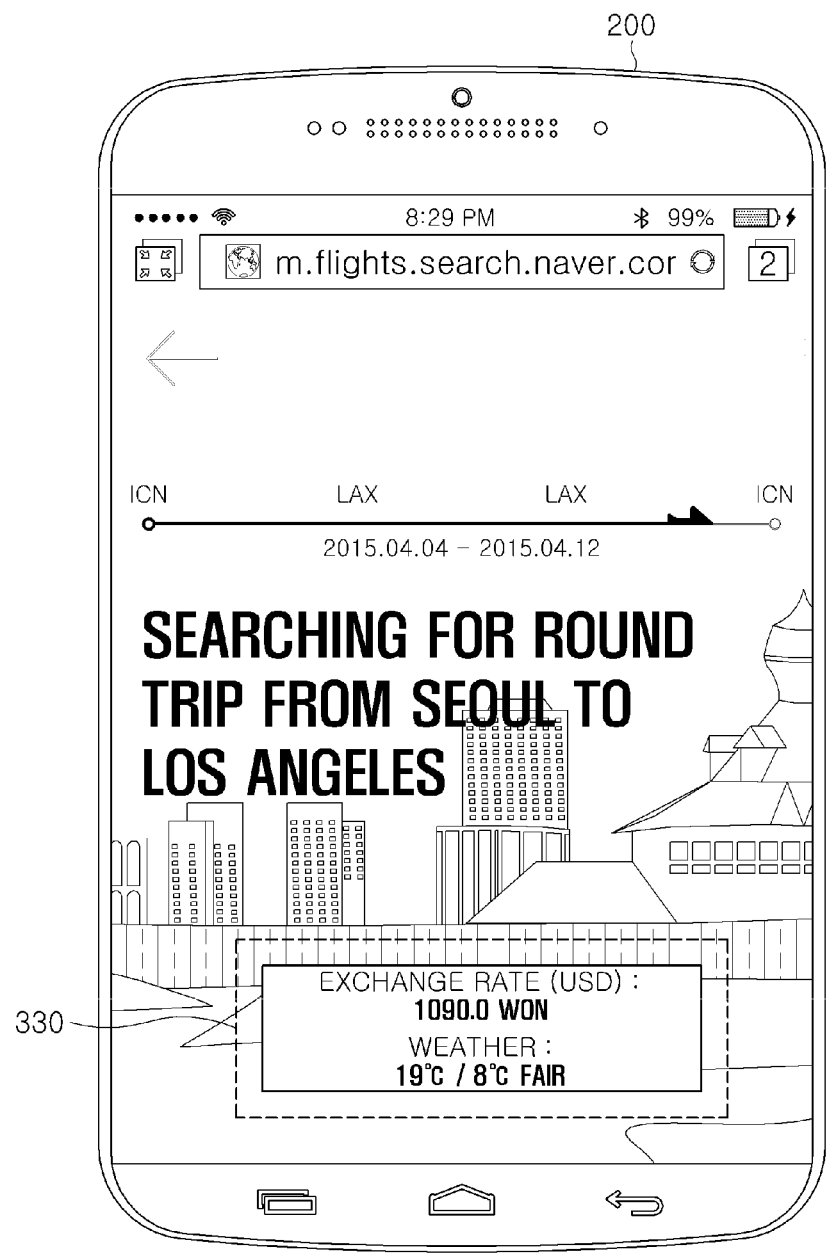
FIG. 3B is an exemplary view showing a travel information providing screen with a flight ticket search according to another embodiment of the present invention.

In an embodiment of the present invention, FIG. 3B exemplifies that the travel information providing screen includes exchange rates and weather information of the place to visit at area 330.

Figure 3C:
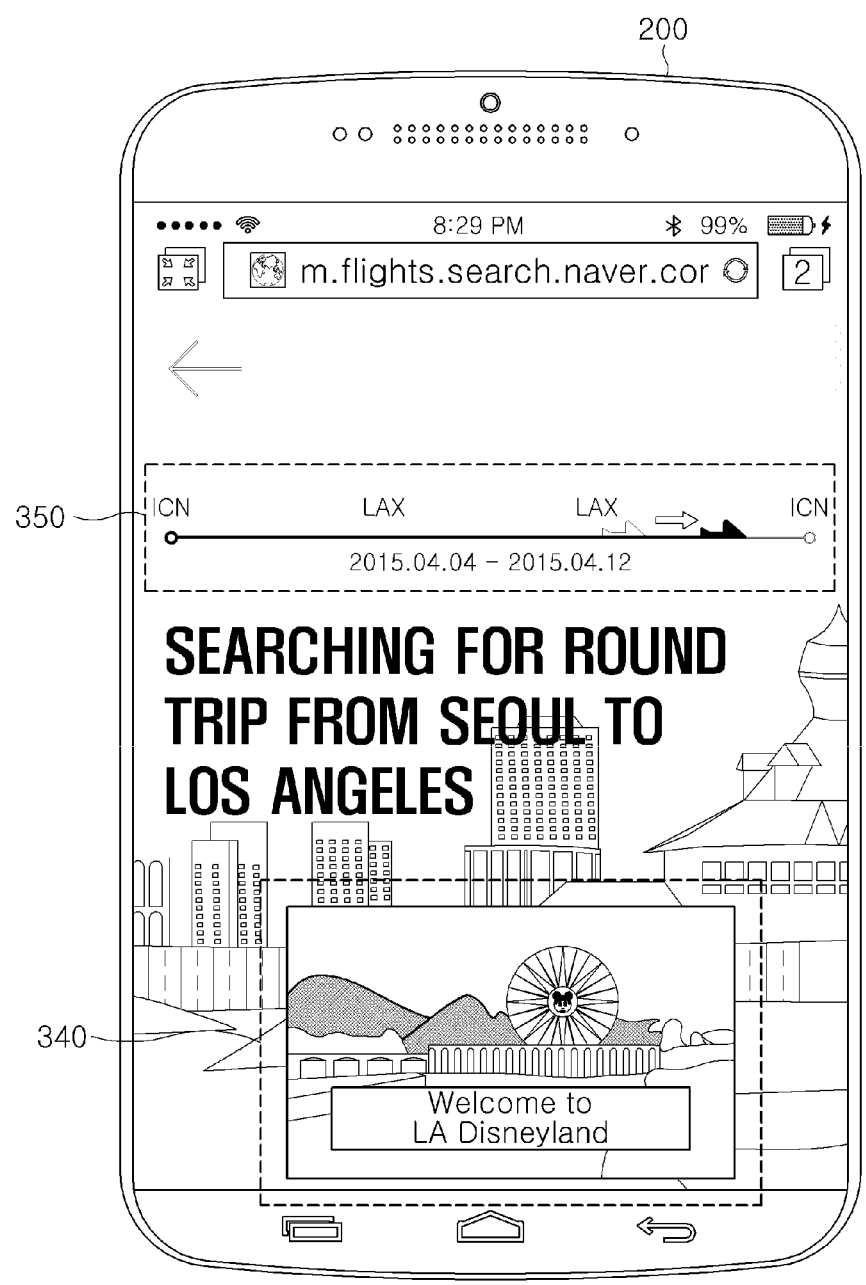
FIG. 3C is an exemplary view showing a travel information providing screen with a flight ticket search according to still another embodiment of the present invention.

Further, on the travel information providing screen, an advertisement related to the flight schedule or the place to visit may also be provided. For example, FIG. 3C exemplifies that an advertisement on LA Disneyland that is located in LA that is the place to visit is included in the travel information providing screen at area 340. By providing the advertisement related to the place to visit through posting of the advertisement on the travel information providing screen, the user's attention thereon can be heightened, and thus the advertisement effect can also be heightened.

Further, in the case of providing the advertisement together on the travel information providing screen, for billing for the advertisement, the billing amount may be calculated in consideration of the user's advertisement click frequency, the advertisement exposure frequency, the user's reaction, or the advertisement reach, such as CPC (Cost Per Click), CPM (Cost Per Mile), CPA (Cost Per Action), and CPL (Click Per Lead).

Further, on the travel information providing screen, a flight path is displayed in addition to a simple display of the flight schedule information, and then a specific animation that corresponds to the flight path is provided. Accordingly, the user can effectively recognize that the search for the flight ticket information is under way, and can be prevented from tediously waiting for the search results. For example, FIG. 3C exemplifies a case where a flight path to make a round trip between Seoul (Incheon) and LA is displayed, and an airplane shape animation is provided 350 along the flight path. In the case where the animation is included as described above, the user can intuitively recognize that the search continues to be performed.

Further, in the case where the animation proceeding state, such as the position of the airplane shape, is associated with the search progress of the flight ticket information, the user can intuitively grasp the search progress of the flight ticket information.

Last, at step S240, the server 100 transmits the searched flight ticket information to the user terminal 200, and then the user terminal 200 may provide the user with the searched flight ticket information or perform an additional process using the flight ticket information. The searched flight ticket information may be appropriately provided to the user terminal 200 in consideration of various factors, such as an environment in which the user searches for the flight ticket information and the quantity of the search results.

Figure 5:
FIG. 5 is an exemplary view showing a flight ticket search result providing screen according to an embodiment of the present invention.

FIG. 5 exemplifies a flight ticket search result providing screen according to an embodiment of the present invention. As shown in FIG. 5, on the flight ticket search result providing screen, a screen of the user terminal 200 may be divided into a first region 510 in which a part (or the entirety) of the travel information that includes the flight schedule information and the information on the places to visit is displayed and a second region 520 in which the searched flight ticket information is provided.

As shown in FIG. 5, by dividing the screen of the user terminal 200 into the first region 510 and the second region 520 and then dividedly providing the traveling information and the flight ticket information to the respective regions, the user can be provided with both the travel information and the flight ticket information more conveniently.

Further, in the method for providing information with a flight ticket search according to an embodiment of the present invention, the server 100 may receive a search word that is input by the user to search for the flight ticket from the user terminal 200, provide a first web page for inputting the flight schedule information to the user terminal 200 as the search result for the search word, and then receive an input of the flight schedule information from the user.

For example, referring again to FIG. 4, in an embodiment of the present invention, if the user inputs a search word "flight ticket" 410 on a search window, it can be known that the first web page for inputting the flight schedule information is provided as the search result for the search word.

More specifically, the server 100 first receives the search word that is input by the user to search for the flight ticket on a search window of the user terminal 200. In this case, the user may input the search word onto the web page for inputting the search word.

Then, the server 100 analyzes the search word that is received from the user terminal 200. The server 100 may determine whether a first type search word that is predetermined to correspond to the 'flight ticket' is included in the received search word. The first type search word may include, for example, 'a flight ticket', 'an airplane ticket', 'an air ticket', or 'an airline ticket', but is not limited thereto. Accordingly, if the first type search word is included in the received search word, the server 100 may determine that the user of the user terminal 200 intends to search for flight ticket information.

Next, if it is determined that the user intends to search for a flight ticket, the server 100 transmits a web page, which includes a first input menu 430 for inputting a departure place, a second input menu 450 for inputting a place to visit, and a third input menu 470 for inputting a travel schedule including the desired travel dates), to the user terminal 200.

Then, the user inputs flight schedule information, such as a departure place, a place to visit, and a travel schedule, using the web page transmitted thereto, and the flight schedule information to the appropriate menus (430, 450 and 470), and then the information that is input by the user is transmitted to the server 100.

Further, when transmitting the first web page to the user terminal 200, the server 100 according to an embodiment of the present invention may automatically input in advance names of places that coincide with the user's intention on the first input menu 430 and the second input menu 450.

For example, if the first type search word as described above is included in the search word received from the user terminal 200, the server 100 may input a city name of a first country and a city name of a second country, which are predetermined based on the previous number of times of searches of users, onto the first input menu and the second input menu. Specifically, if the previous users have searched for flight tickets from Incheon in Korea to LA in USA a large number of times, the server 100 may input Incheon onto the first input menu and LA onto the second input menu of the first web page, and transmit the corresponding first web page to the user terminal 200.

As another example, if the second type of search word, which is predetermined to correspond to a country name or a continent name, is included in the search word received from the user terminal 200 together with the first type search word, the server 100 may first input a city name of a first country, which is predetermined based on the number of times of searches of users, onto the first input menu, and then input a city name, which is determined based on the number of times of searches of the users among city names of a country or a continent that corresponds to the second type search word included in the received search word, onto the second input menu. For example, if the search word received from the user terminal 200 is 'flight ticket to France' or 'flight ticket to Europe', the server 100 determines 'France' or 'Europe' as the second type search word and 'flight ticket' as the first type search word, inputs a city name of the predetermined first country (e.g., Incheon in Korea) onto the first input menu, and inputs a city name (e.g., Paris) that is determined based on the number of times of search of the users among city names of France onto the second input menu. This is to consider the point that most users include information on places to visit in a search word when inputting the search word to search for flight tickets.

As still another example, if the first type search word and a third type search word that is predetermined to correspond to a city name are included in the search word received from the user terminal 200, the server 100 may input a city name of a first country, which is predetermined based on the number of times of searches of users, onto the first input menu, and input a city name, which corresponds to the third type search word included in the received search word, onto the second input menu. For example, if the search word received from the user terminal is 'flight ticket to Paris', the server 100 determines 'Paris' as the third type search word and 'flight ticket' as the first type search word, inputs a city name of the predetermined first country (e.g., Incheon in Korea) onto the first input menu, and inputs a city name (e.g., Paris) that corresponds to the third type search word onto the second input menu.

Figure 6:
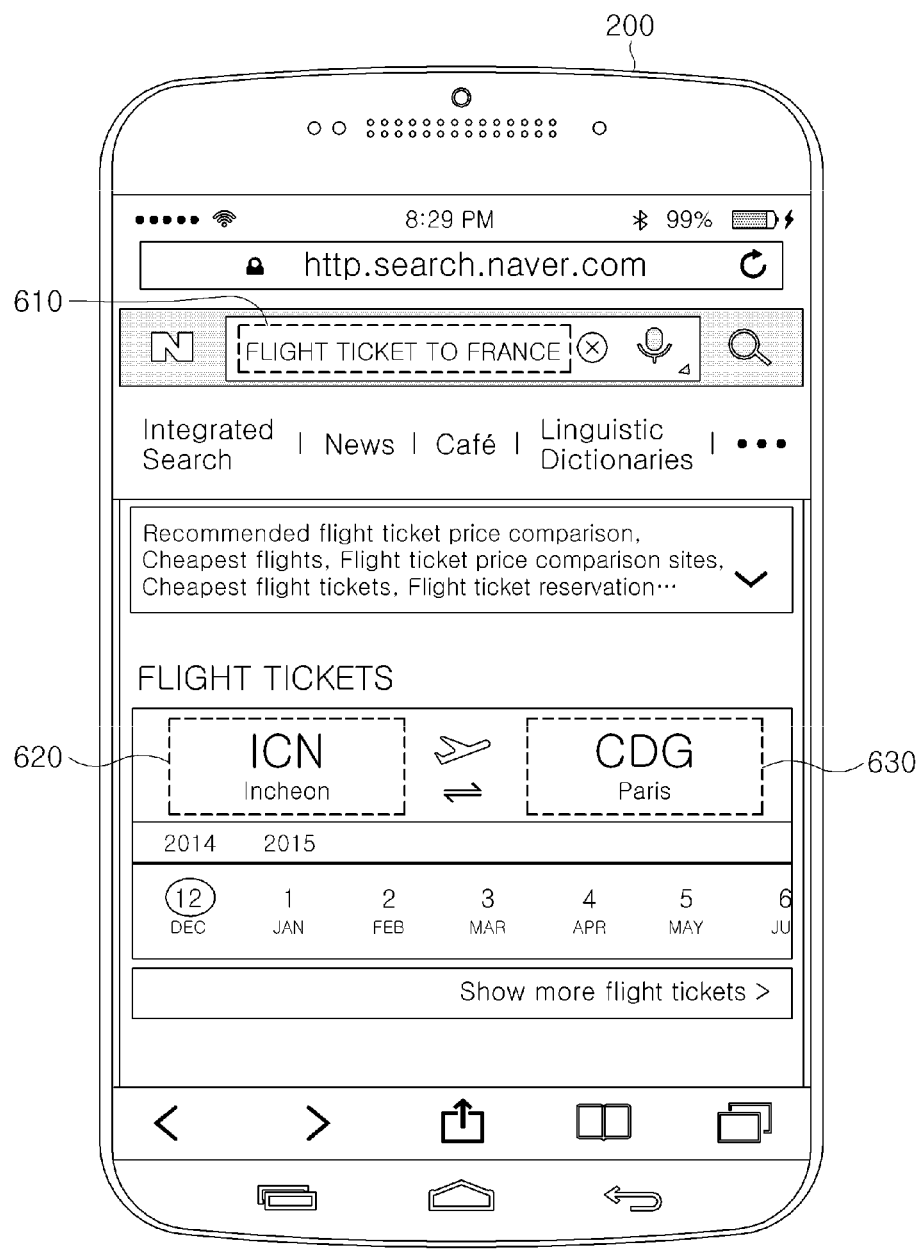
FIG. 6 is an exemplary view showing a screen on which flight schedule information is automatically input through analysis of a search word according to an embodiment of the present invention.

As a detailed example thereof, FIG. 6 exemplifies a screen on which flight schedule information is automatically input through analysis of a search word to be provided to a user according to an embodiment of the present invention.

As shown in FIG. 6, if the user inputs 'flight ticket to France' onto a search window 610 of a portal site as a search word, as described above, the server 100 may extract the first type search word (flight ticket) and the second type search word (France) through analysis of the search words 'flight ticket to France' that is input by the user, and provide the user with the first web page which is formed by automatically inputting in advance a city name (Paris) in area 630 that is determined on the basis of the number of times of searches of the users among city names in France on the second input menu for inputting a place to visit using the extracted search words. Further, as another example, if the user inputs 'flight ticket to the Americas' onto the search window as a search word, the server 100 may form the first web page by automatically inputting the city name (LA) of the place to visit on the second input menu based on the number of times of searches of the previous users among cities of the American continent, and then provide the formed web page to the user.

Further, in selecting the place to visit that is automatically input onto the second input menu, the place to visit may be selected in consideration of the user's search time, travel time, user's geographical location information, and information on the user's taste, in addition to the number of times of searches of the users.

Further, the departure place to be automatically input onto the first input menu of the first web page may be selected in consideration of the number of times of searches of the users, and in addition, the departure place may be selected in consideration of the user's geographical location information.

In this case, it is not always necessary for the user to input the search word onto the search window of the flight ticket search site related to the travel, but as shown in FIG. 6, even in the case where the user inputs a search word in area 610 for searching for the flight ticket onto the search window of a portal site, the first web page may be formed by reflecting in advance the user's departure place or the place to visit using the first type search word and the second type search word included in the search word as the search result for the search word, and then may be provided to the user. In this case, the user can receive the flight ticket search page, in which the departure place or the arrival place has been automatically input in advance, simultaneously with the reception of the search result including the related web page or related information, and thus the user can collect the necessary information more conveniently.

Further, even if a natural language type search word is input as the search word (e.g., even if a natural language sentence like "the cheapest round-trip flight ticket to France?" is input as the search word), the first type search word and the second type search word may be extracted through analysis of the natural language type search word, and the first web page, in which the departure place and the place to visit are predetermined, may be formed using the extracted search words to be provided to the user.

Further, if the departure place and the place to visit, which have been automatically input in advance onto the first web page by the server 100, are incorrect (i.e. do not match what the user intends), it should be apparent that the user can modify the information on the departure place and the place to visit on the first web page.

Figure 7:
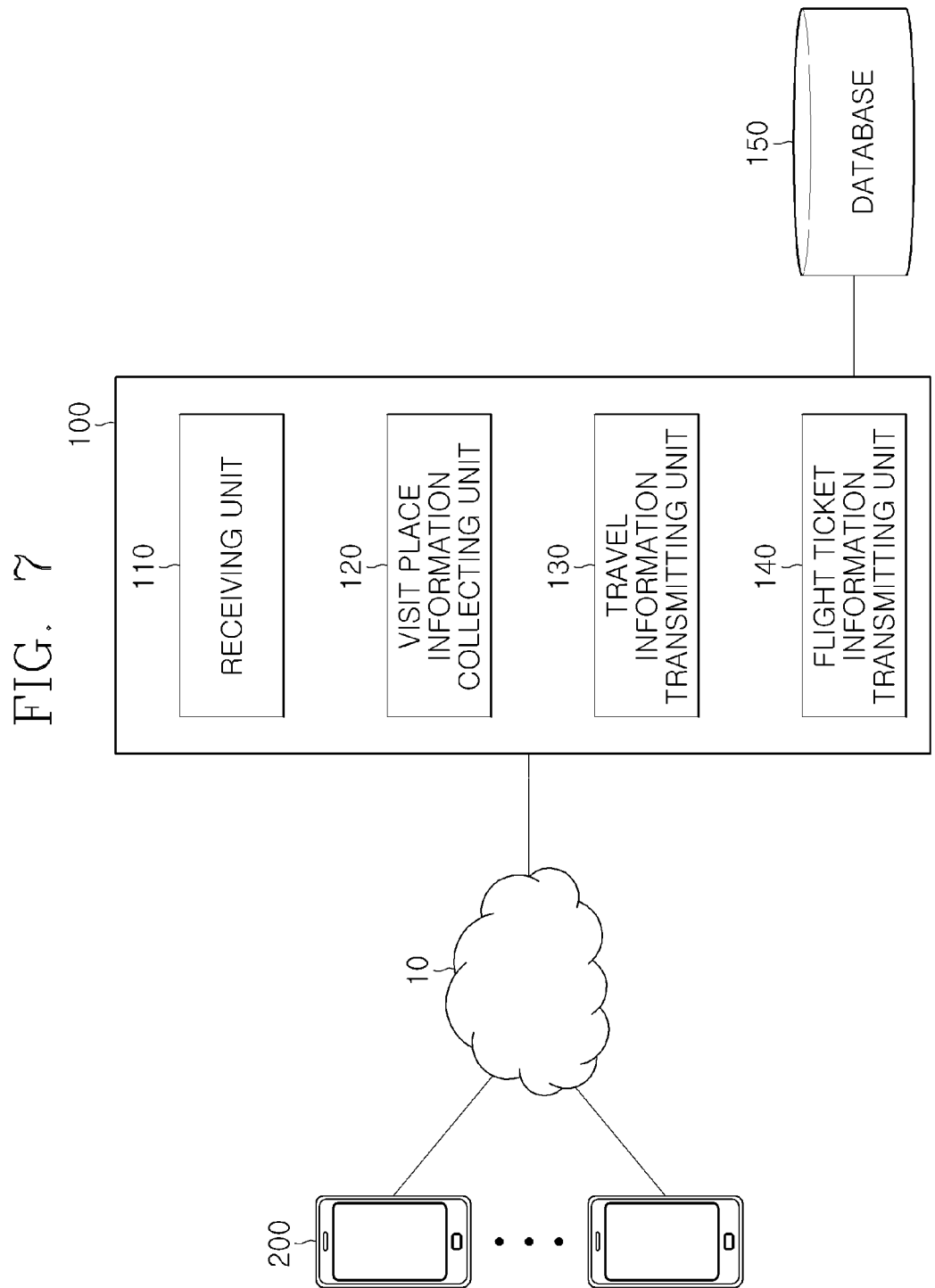
FIG. 7 is a view showing the configuration of a server that provides information with a flight ticket search according to an embodiment of the present invention.

FIG. 7 exemplifies the configuration of a server 100 that provides information with a flight ticket search according to an embodiment of the present invention. As shown in FIG. 7, the server 100 according to an embodiment of the present invention may include a receiving unit 110, a visit place information collecting unit 120, a travel information transmitting unit 130, and a flight ticket transmitting unit 140.

Further, the receiving unit 110, the visit place information collecting unit 120, the travel information transmitting unit 130, and the flight ticket transmitting unit 140 may be configured as a processor that operates under the control of at least one program stored in a memory (not illustrated).

First, the receiving unit 110 receives the flight schedule information that is input by the user from the user terminal 200. Further, the receiving unit 110 may receive the search word, which is input by the user to search for the flight ticket, from the user terminal 200.

The visit place information collecting unit 120 collects information on places to visit using the flight schedule information that is input by the user. In this case, in collecting the information on the places to visit, the visit place information collecting unit 120 may search for the information from a database 150 in which the information on the places to visit has been collected and stored in advance, and if needed, may collect and use information that is provided in real time by other servers. Further, the visit place information collecting unit 120 may collect the information on the places to visit in consideration of the schedule in which the user visits the places to visit.

Further, the travel information transmitting unit 130 may transmit the collected information on the places to visit to the user terminal 200 so as to provide a travel information providing screen that includes the flight schedule information and the information on the places to visit on the entire screen, or only on a partial region of the screen, of the user terminal 200 until the search for the flight ticket information that corresponds to the flight schedule information is completed.

In this case, by using a photo or a picture of the place to visit as a background image of the travel information providing screen, the visual effect of the photo or the picture of the place to visit can be maximized.

Further, on the travel information providing screen, an advertisement related to the flight schedule or the place to visit may also be provided.

Further, on the travel information providing screen, a specific animation that corresponds to a flight path included in the flight schedule information may also be displayed.

Last, the flight ticket information transmitting unit 140 transmits the flight ticket information, that has been searched for with respect to the flight schedule information, to the user terminal 200 to provide the user with the flight ticket information.

FIG. 8 exemplifies a flowchart showing a method for providing information with a flight ticket search according to an embodiment of the present invention.

Hereinafter, referring to FIG. 8, the operation of the user terminal 200 according to an embodiment of the present invention will be described in more detail.

At step S810, the user terminal 200 transmits the flight schedule information that is input by the user to the server 100. In this case, the user terminal 200 may provide a web page for inputting the flight schedule information to the user, and further, in the case where the user inputs a specific search word onto the search window, the user terminal 200 may provide the user with the name of a place that coincides with the user's intention, which has been automatically input in advance onto the web page, in a method to analyze the search word.

Then, at step S820, the user terminal 200 receives the information on places to visit collected using the flight schedule information from the server 100. In this case, in collecting the information on the places to visit, the information may be searched for from a database in which the information on the places to visit has been collected and stored in advance, and if needed, may collect and use information that is provided in real time by other servers. Further, it is also possible to collect the information on the places to visit in consideration of the schedule (such as the dates or season) in which the user intends to visit the places to visit.

Further, at step S830, the user terminal 200 provides a travel information providing screen including the flight schedule information and the information on the places to visit on the entire terminal screen, or only on a region of the user terminal screen, while the server 100 searches for the flight ticket information that corresponds to the flight schedule information, that is, before receiving the flight ticket information that is searched for corresponding to the flight schedule information.

In this case, since the photo or the picture of the place to visit is used as the background image of the travel information providing screen, the visual effect of the photo or the picture of the place to visit can be maximized. Further, on the travel information providing screen, an advertisement related to the flight schedule or the place to visit may also be provided. In this case, for billing for the advertisement, the billing amount may be calculated in consideration of the user's advertisement click frequency, the advertisement exposure frequency, the user's reaction, or the advertisement reach, such as by using CPC (Cost Per Click), CPM (Cost Per Mile), CPA (Cost Per Action), and CPL (Click Per Lead).

Further, on the travel information providing screen a specific animation that corresponds to a flight path included in the flight schedule information may also be displayed.

Last, at step S840, the user terminal 200 receives the searched flight ticket information from the server 100, and then the user terminal 200 may provide the user with the searched flight ticket information or perform an additional process using the flight ticket information.

FIG. 9 exemplifies the configuration of a user terminal that provides information with a flight ticket search according to an embodiment of the present invention. As shown in FIG. 9, the user terminal 200 according to an embodiment of the present invention may include a transmitting unit 210, a visit place information receiving unit 220, a travel information providing unit 230, and a flight ticket information providing unit 240. The transmitting unit 210, the visit place information receiving unit 220, the travel information providing unit 230, and the flight ticket information providing unit 240 may be configured as a processor that operates under the control of at least one program stored in a memory (not illustrated). First, the transmitting unit 210 transmits the flight schedule information that is input by the user to the server 100.

Further, the visit place information receiving unit 220 receives information on the places to visit collected using the flight schedule information from the server 100.

Further, the travel information providing unit 230 provides the travel information providing screen that includes the flight schedule information and the information on the places to visit on the entire screen, or on only a part of the screen, of the user terminal 200 before the search for the flight ticket information that corresponds to the flight schedule information is completed.

Last, the flight ticket information providing unit 240 receives the searched flight ticket information from the server 100, and provides the received flight ticket information to the user.

The embodiments of the present invention as described above may also be prepared as a program that can be executed by a computer, and may be executed by a general digital computer that operates the program using a computer readable recording medium, or other non-transient storage medium.

The program may be not only be a program that is implemented by machine codes made by a compiler, but may also a program that is implemented by high-level language codes that can be executed by a computer using an interpreter.

Further, the computer readable recording medium may include all storage media, such as a magnetic storage medium (e.g., ROM, floppy disc, or hard disc), an optical reading medium (e.g., CD-ROM or DVD), and a carrier wave (e.g., transmission through the Internet). Further, the program may be recorded in a hardware device that is specially configured to store and execute a program command, such as a ROM, a RAM, or a flash memory, or a storage device of a terminal, such as a smart phone or a PC.

Further, the computer is not limited to a personal computer (PC) or a notebook computer, but may include all information processing devices provided with CPUs and capable of executing computer programs, such as a server, a smart phone, a tablet PC, a PDA, or a portable phone.

Although preferred embodiments of the present invention have been described for illustrative purposes, those skilled in the art will appreciate that various modifications, additions and substitutions are possible, without departing from the scope and spirit of the invention as disclosed in the accompanying claims. Accordingly, the embodiments of the present invention described herein are merely representative for purposes of describing the technical ideas of the present invention and the technical ideas of the present invention should not be construed as limited to only the embodiments set forth herein. The protective scope of the present invention should be interpreted by the following claims and all technical ideas falling within the equivalent scope thereof should be interpreted to fall within the scope of rights of the present invention.

What is claimed is:

1. A method for providing information by a server while searching the Internet for a flight ticket, comprising steps of:
   receiving flight schedule information, including arrival information comprising an arrival place and an arrival date, of a user that is transmitted from a user terminal;
   using the received arrival information, including the arrival place and the arrival date, for collecting information on places to visit considering the places to visit and a schedule calculated from the flight schedule information;
   transmitting, by the server, the collected information on the places to visit to the user terminal and making, by the server, the user terminal provide the user with a travel information providing screen including the information on the places to visit in a first area of a screen of the user terminal, together with at least a part of the flight schedule information in a second area of the screen of the user terminal separated from the first area, while the server is searching for flight ticket information that corresponds to the flight schedule information and will result in transmitting the searched flight ticket information to the user terminal, wherein the travel information providing screen also includes animation indicating the progress of the search for the flight ticket information; and
   after the server completes the search for the flight ticket information, terminating the travel information providing screen and transmitting the searched flight ticket information to the user terminal,
   wherein the information on the places to visit on the travel information providing screen includes information that has been searched and collected based on the arrival information transmitted from the user terminal that includes both: (i) information that has been pre-stored in a database and that comprises at least one of a photo related to a place to visit, a picture related to a place to visit, and moving images related to a place to visit; and (ii) information provided in real time from another server comprising at least one of the following types of information: (a) an exchange rate related to a place to visit, (b) a sightseeing resort related to a place to visit, (c) an accommodation related to a place to visit, (d) traffic information related to a place to visit and (e) weather related to a place to visit based on the arrival place and the arrival date.

2. The method of claim 1, wherein the information on the places to visit includes a photo related to a place to visit, and the photo related to the place to visit is used as a background image of the travel information providing screen.

3. The method of claim 1, wherein the server collects the information on the places to visit in consideration of a season associated with the flight schedule information.

4. The method of claim 1, wherein on the travel information providing screen, a flight path of the flight schedule information and a specific animation that corresponds to the flight path are displayed as the animation indicating the progress of the search for the flight ticket information.

5. The method of claim 1, wherein on the travel information providing screen, an advertisement related to a flight schedule or a place to visit is also provided together.

6. The method of claim 1, further comprising:
   receiving a search word, which is input by the user to search for the flight ticket, from the user terminal;
   forming a first web page for inputting the flight schedule information using the received search word and transmitting the first web page to the user terminal; and
   receiving the flight schedule information that is input by the user through the first web page from the user terminal.

7. The method of claim 6, wherein during the step of transmitting the first web page, the server analyzes the search word that is input by the user and transmits the first web page, in which at least one of a departure place and a place to visit has been automatically input in advance, to the user terminal.

8. The method of claim 7, wherein if a first type search word that is predetermined to correspond to the flight ticket is included in the search word that is input by the user, the server forms the first web page by automatically inputting in advance the departure place that is determined on the basis of geographical location information of the user.

9. The method of claim 7, wherein if a second type search word that is predetermined to correspond to a country name or a continent name is included in the search word that is input by the user, the server forms the first web page by automatically inputting in advance a place to visit that is determined on the basis of the number of times of searches of users among places to visit corresponding to the country name or the continent name.

10. The method of claim 7, wherein if a first type search word that is predetermined to correspond to the flight ticket is included in the search word that is input by the user, the server forms the first web page by automatically inputting in advance the departure place that is determined on the basis of the number of times said departure place occurs in searches of other users.

11. The method of claim 1, wherein at the step of transmitting the searched flight ticket information, the screen of the user terminal is divided into a first region, on which at least a part of travel information is displayed, and a second region, on which the searched flight ticket information is provided.

12. A method for providing information by a user terminal while searching the Internet for a flight ticket, comprising steps of:
   transmitting flight schedule information, including arrival information comprising an arrival place and an arrival date, of a user to a server;
   receiving information on places to visit collected using the arrival information, including the arrival place and the arrival date, transmitted from the server;

providing, by the user terminal, the user with a travel information providing screen including the information on the places to visit, considering the places to visit and a schedule calculated from the flight schedule information, in a first area of a screen of the user terminal, together with at least a part of the flight schedule information in a second area of the screen of the user terminal separated from the first area, before receiving flight ticket information that is searched for corresponding to the flight schedule information from the server wherein the travel information providing screen also includes animation indicating the progress of the search for the flight ticket information, wherein the information on the places to visit on the travel information providing screen includes information that has been searched and collected based on the arrival information transmitted from the user terminal that includes both: (i) information that has been pre-stored in a database and that comprises at least one of a photo related to a place to visit, a picture related to a place to visit, and moving images related to a place to visit; and (ii) information provided in real time from another server comprising at least one of the following types of information: (a) an exchange rate related to a place to visit, (b) a sightseeing resort related to a place to visit, (c) an accommodation related to a place to visit, (d) traffic information related to a place to visit and (e) weather related to a place to visit based on the arrival place and the arrival date, and after the server completes the search for the flight ticket information, terminating the travel information providing screen and receiving the searched flight ticket information from the server.

13. A non-transitory computer-readable medium storing a computer program thereon which, upon execution by a computing system, causes the computing system to perform steps comprising:

transmitting flight schedule information, including arrival information comprising an arrival place and an arrival date, of a user from a user terminal to a server;

receiving information at the user terminal on places to visit collected using the arrival information, including the arrival place and the arrival date, transmitted from the server;

providing the user at the user terminal with a travel information providing screen including the information on the places to visit, considering the places to visit and a schedule calculated from the flight schedule information, in a first area of a screen of the user terminal, together with at least a part of the flight schedule information in a second area of the screen of the user terminal separated from the first area, before receiving flight ticket information that is searched for corresponding to the flight schedule information from the server, wherein the search for the flight ticket information is a search of the Internet, wherein the travel information providing screen also includes animation indicating the progress of the search for the flight ticket information, wherein the information on the places to visit on the travel information providing screen includes information that has been searched and collected based on the arrival information transmitted from the user terminal that includes both: (i) information that has been pre-stored in a database and that comprises at least one of a photo related to a place to visit, a picture related to a place to visit, and moving images related to a place to visit; and (ii) information provided in real time from another server comprising at least one of the following types of information: (a) an exchange rate related to a place to visit, (b) a sightseeing resort related to a place to visit, (c) an accommodation related to a place to visit, (d) traffic information related to a place to visit and (e) weather related to a place to visit based on the arrival place and the arrival date, and after the server completes the search for the flight ticket information, terminating the travel information providing screen and receiving at the user terminal the searched flight ticket information from the server.

* * * * *